June 28, 1955  V. M. BAILEY  2,711,609
FISHING LURE
Filed Sept. 22, 1952
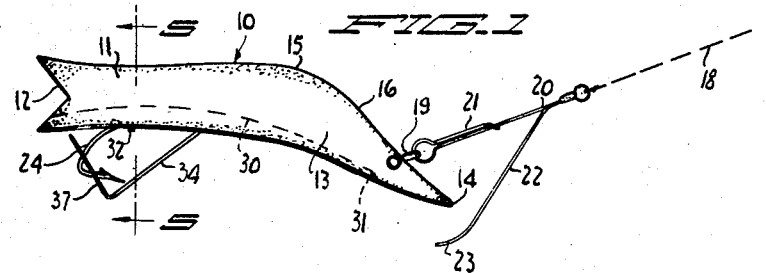
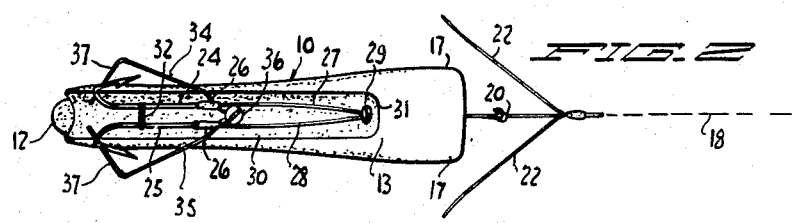
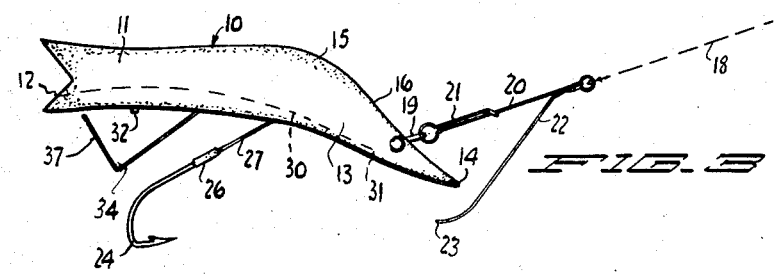
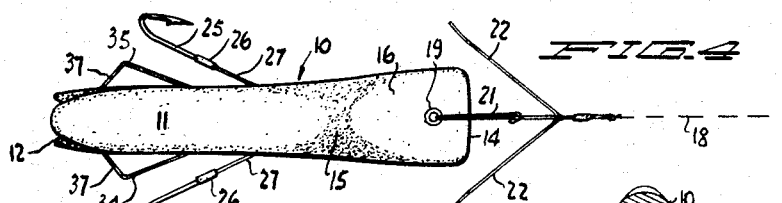
INVENTOR
VERNON M. BAILEY
BY
ATTORNEYS

United States Patent Office 2,711,609
Patented June 28, 1955

2,711,609

FISHING LURE

Vernon M. Bailey, Minneapolis, Minn.

Application September 22, 1952, Serial No. 310,797

5 Claims. (Cl. 43—35)

My invention relates to improvements in artificial lures or baits, commonly called plugs, which are used in casting and trolling for fish.

The primary object of my invention is to provide a lure which will have an enticing action when drawn through the water by the fishing line and in which such action will occur even when the lure is moved at a very slow rate. This is important as many game fish are attracted to a slowly moving lure and are more inclined to strike it than a lure which must travel fast in order to bring out its action.

Another object is to provide a lure which is substantially completely weedless so that it may be used in the weeds and other vegetation found in the water, about which game fish are prone to gather for shelter, and for the natural foods which abound in the weed beds. In accordance with this object my lure has a pair of hooks which, when set, are protected from the weeds by very effective weed guards but these hooks are carried by spring wires and will spring outward and downward to hooking positions when a fish strikes the lure. Further in accordance with this object of my invention the body itself of the lure is provided with forwardly arranged weed guard wires so that weeds will not become entangled on the forward end of the lure, these guard wires also serving somewhat as sled runners so that the lure may travel along the bottom or over rocks in the water without trouble.

Still another object is to provide a lure which has flexible fins and is of an attractive and natural appearing shape and susceptible to finishing in many attractive colorations and textures.

These and other more detailed and specific objects will be disclosed in the course of the following specification, reference being had to the accompanying drawings, in which—

Fig. 1 is a side view of the lure, the hooks being in their set and guarded position.

Fig. 2 is a bottom view of the lure.

Fig. 3 is another side view but showing the hooks sprung to their hooking positions.

Fig. 4 is a top plan view of the lure with the hooks sprung.

Fig. 5 is an enlarged cross section through the rear end portion of the lure body showing the catch for the hooks, the shanks and rear ends of the hooks and the guards, the view being taken about on the line 5—5 in Fig. 1.

Fig. 6 is a side view of a modification of my invention.

Referring now more particularly and by reference characters to the drawing, my improved fishing lure comprises a body, designated generally at 10, which is buoyant or semi-buoyant so that it will travel at a desired depth in the water. Very important is the shape and configuration of this body 10 because, as all those skilled in the art know, a successful lure must have an action which is attractive and deceiving, and such action should occur when the lure is pulled through the water at a slow speed. In fact many game fish will ignore a fast moving lure, preferring to strike one which travels slowly and apparently is regarded as a wounded minnow, or the like. In many instances also a lure which has an erratic action is more successful than one which has merely a smooth, even wobbling and swimming action. Experts in the piscatorial arts are known to "work" their lures to impart variations in their travel speeds in order to impart this attractive erratic action to them, for this reason. In accordance with my invention as now will be described my lure has all of these desirable characteristics built in, so to speak, and experience in repeated tests has demonstrated that it is very effective, even in the hands of the not so expert fisherman.

The body 10 has a rear end portion 11 which is substantially rounded in cross section and is forked at its rear extremity or tail 12. Said rear end portion merges into a downwardly and forwardly curving forward end portion 13 and as viewed from the side this forward end tapers to a chisel-like and quite sharp front edge 14. There is a pronounced, rounded hump 15 near the center, and forwardly thereof the lure has a quite flat top surface 16 which curves downward and then slightly upward to the edge 14. In the top and bottom views it will also be noted that the lure increases in width in the forward direction and that the edge 14 is quite wide, being rounded and smoothed off at opposite sides 17. These characteristics contribute to the production of an enticing and erratic wobbling, swimming action as the lure moves forward through the water. The line 18 is attached at the point 19, the line riding at about the position shown, and the substantially flat surface 16 offers very considerable resistance to the travel but lateral resistance is much less, due to the forward taper, and the lure thus alternately slips from one side to the other, giving it a swimming effect. The lack of lateral resistance and the wide forward end brings this action out at even very slow speeds. Due to the hump 15 maximum buoyancy is present at about the midpoint and the lure carries the weight of the attached hooks and weed guards, next to be described, while maintaining the desired position with the rear part traveling about horizontal as seen in Figs. 1 and 3.

The line 18 is actually connected to a forward weed guard 20, having a snap fastening 21 to connect with the eye 19, and with downwardly and rearwardly angling and diverging guard wires 22 which extend below the edge 14. Thus these wires 22 not only will prevent weeds from becoming entangled with the body 10 but their slightly curved lower ends 23 will act as "sled runners" so the lure may travel along the bottom and over rocks without snagging, and without damage to the forward edge 14.

The lure is provided with two hooks 24—25 of the "single" variety rather than the treble hooks with which most lures are fitted and these hooks 24—25 are secured at 26 to the rear ends of spring wires 27—28. The forward bight portion of the wires 27—28 are secured at 29 to the lure body. A longitudinal groove 30 extends from the forward point 31, some distance forward of the center of the body, rearwardly along a medial line and it is in this groove that the wires are secured. Normally the wires 27—28 tend to spring the hooks downward and apart, as seen in Figs. 3 and 4, but when the lure is put in use the hooks are held in a set position with their shanks up in the groove 30, as in Figs. 1 and 2. The hooks are releasably held in this set condition by means of a catch 32 depending in the groove adjacent the rear end thereof, and having opposite projections 33 (Fig. 5) for holding the shanks of the hooks upward. However, when a fish strikes or takes the lure in its mouth the hooks will be forced upward and will fly out of the catch toward their sprung positions so that they may properly hook the fish, as will be understood.

The hooks 24—25 are guarded by weed guard wires 34—35 formed from a single folded length of spring wire and at the forward bight portion the wires are secured at 36 in the groove 30 forward of the catch 32. From this point the guard wires 34—35 diverge and follow the contour of the sides of the groove to clear the hooks and then angle downward and apart beyond the points of the hooks and outwardly thereof, as seen in Figs. 1 and 2. At about the plane of the points of the hooks the wires then angle upward and inward at 37 to about the lower edge of the lure. So arranged and shaped the wires will very effectively prevent the entanglement of weeds with the hooks when they are in their set positions, but with no interference with the action of the hooks.

Thus it will be seen that I have provided a lure which will have an attractive and effective action and which furthermore is usable in even the weediest water, where fish are often most numerous.

Allure may be added and the bait given a simulation of waving legs or appendages by the addition of two or more fins 38 secured in any suitable manner to the sides of the body 10, as seen in Fig. 6. Such fins, made of thin, limber material, will wave and vibrate as the lure works from side to side, giving it a most lifelike appearance and in addition somewhat concealing the hooks and weed guards. Any number and arrangement of the fins may be used as desired.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A fishing lure for casting and trolling comprising a body having a line attachment means adjacent its forward end and said body curving downward and forward for imparting action as the lure is drawn through the water, the body having a longitudinal groove in its underside, at least one fish hook, spring means secured to said body in said groove and forming a mounting for said fish hook and biasing the hook to spring downward, a catch for releasably holding the hook upward in the groove, and a weed guard secured in the groove and guarding the hook when the same is engaged in the catch.

2. A fishing lure for casting and trolling comprising a body having a line attachment means adjacent its forward end, the body having a longitudinal groove in its underside, at least one fish hook, spring means secured to said body in said groove and forming a mounting for said fish hook and biasing the hook to spring downward, a catch for releasably holding the hook upward in the groove, and a weed guard secured in the groove and guarding the hook when the same is engaged in the catch.

3. A fishing lure for casting and trolling comprising a body having a line attachment means adjacent its forward end and said body curving downward and forward for imparting action as the lure is drawn through the water, the body having a longitudinal groove in its underside, a pair of fish hooks, spring wire means secured to the body in the forward part of said groove and forming a mounting for said fish hooks and biasing the hooks to swing downwardly apart to a hooking position, a catch in the rear part of the groove having opposite projections to engage the hooks and releasably hold them upward in the groove, and weed guards for the hooks.

4. A fishing lure for casting and trolling comprising a body having a line attachment means adjacent its forward end and said body curving downward and forward for imparting action as the lure is drawn through the water, the body having a longitudinal groove in its underside, a pair of fish hooks, spring wire means secured to the body at the forward part of said groove and forming a mounting for the fish hooks and biasing the hooks to swing downwardly apart to a hooking position, a catch in the rear part of the groove having opposite projections to engage the hooks and releasably hold them upward in the groove, and weed guard wires secured in the groove forwardly of the catch and angling downward and then upward in a rearward direction for guarding the hooks when they are held in said catch.

5. A fishing lure of the character described, comprising a body having a line attachment means adjacent its forward end, the body having a longitudinal groove in its underside, a pair of fish hooks, spring means secured to the body at one end portion of the said groove and forming a mounting for the fish hooks and biasing the hooks to normally swing downwardly and apart to hooking positions, and a catch in the groove having means for releasably engaging and holding the hooks upward in the groove.

References Cited in the file of this patent

UNITED STATES PATENTS

| Number | Name | Date |
|---|---|---|
| D. 46,794 | Yakeley | Dec. 22, 1914 |
| D. 147,044 | Hilton | July 8, 1947 |
| D. 159,402 | Algier | July 25, 1950 |
| 1,101,223 | Welles | June 23, 1914 |
| 1,419,540 | Brown | June 13, 1922 |
| 1,569,993 | MacLeod | Jan. 19, 1926 |
| 2,270,070 | McArthur | Jan. 13, 1942 |